United States Patent
Yu et al.

(10) Patent No.: US 7,095,542 B2
(45) Date of Patent: Aug. 22, 2006

(54) ELECTROABSORPTION MODULATOR HAVING A BARRIER INSIDE A QUANTUM WELL

(75) Inventors: Paul K. Yu, San Diego, CA (US); Dong-Soo Shin, Petaluma, CA (US)

(73) Assignee: The Regents of the University of California, Oakland, CA (US)

(*) Notice: Subject to any disclaimer, the term of this patent is extended or adjusted under 35 U.S.C. 154(b) by 308 days.

(21) Appl. No.: 10/470,783

(22) PCT Filed: Feb. 1, 2002

(86) PCT No.: PCT/US02/02794

§ 371 (c)(1),
(2), (4) Date: Jul. 30, 2003

(87) PCT Pub. No.: WO02/061499

PCT Pub. Date: Aug. 8, 2002

(65) Prior Publication Data

US 2004/0070810 A1  Apr. 15, 2004

Related U.S. Application Data

(60) Provisional application No. 60/265,954, filed on Feb. 1, 2001.

(51) Int. Cl.
G02F 1/07 (2006.01)
H01S 5/20 (2006.01)
H01L 29/06 (2006.01)
(52) U.S. Cl. ............ 359/248; 372/45.01; 257/21
(58) Field of Classification Search ........ 359/245, 359/247, 248, 254; 372/46, 45.01; 257/14, 257/21
See application file for complete search history.

(56) References Cited

U.S. PATENT DOCUMENTS

| | | | | |
|---|---|---|---|---|
| 5,048,036 A | * | 9/1991 | Scifres et al. | 372/45.011 |
| 5,541,949 A | * | 7/1996 | Bhat et al. | 372/45.011 |
| 5,647,029 A | * | 7/1997 | Mihailidi et al. | 385/2 |
| 5,671,242 A | * | 9/1997 | Takiguchi et al. | 372/45.011 |
| 5,946,336 A | * | 8/1999 | Mizutani et al. | 372/50.1 |

OTHER PUBLICATIONS

Aoki et al., "InGaAs/InGaAsP MQW Electroabsorption Modulator Integrated with a DFB Laser Fabricated by Band-Gap Energy Control Selective Area MOCVD", IEEE Journal of Quantum Electronics, vol. 29, No. 6, Jun. 1993, pp. 2088-2096.

Devaux et al., "InGaAsP/InGaAsP Multiple-Quantum-Well Modulator with Improved Saturation Intensity and Bandwidth Over 20 GHz", IEEE Photonics Technology Letters, vol. 4, No. 7, Jul. 1992, pp. 720-723.

Kotaka et al., "High-Speed and Low-Driving-Voltage InGaAs/InAlAs Multiquantum Well Optical Modulators", Electronics Letters, vol. 27, No. 23, Nov. 7, 1991, pp. 2162-2163.

(Continued)

*Primary Examiner*—Ricky Mack
*Assistant Examiner*—William Choi
(74) *Attorney, Agent, or Firm*—Greer, Burns & Crain, Ltd.

(57) ABSTRACT

An electroabsorption modulator (10) includes at least one quantum well (26) in a conduction band and a corresponding quantum well (26) in a valence band. A barrier made from InGaAlAs or InGaAsP is formed within each of the quantum wells in the conduction and valence bands.

17 Claims, 4 Drawing Sheets

OTHER PUBLICATIONS

Loi et al., "High-Efficiency 1.3 μm InAsP-GaInP MQW Electroabsorption Waveguide Modulators for Microwave Fiber-Optic Links", IEEE Photonics Technology Letters, vol. 8, No. 5, May 1996, pp. 626-628.

Miller et al., "Band-Edge Electroabsorption in Quantum Well Structures: The Quantum-Confined Stark Effect", Physical Review Letters, vol. 53, No. 22, Nov. 26, 1984, pp. 2173-2176.

Ougazzaden et al., "Strained InGaAsP/InGaAsP/InAsP Multi-Quantum Well Structure for Polarization Insensitive Electroabsorption Modulator with High Power Saturation", App. Phys. Lett. 69, No. 27, Dec. 30, 1996, pp. 4131-4132.

Pappert et al., "Polarization Dependence of a 1.52 μm InGaAs/InP Multiple Quantum Well Waveguide Electroabsorption Modulator", IEEE Photonics Technology Letters, vol. 2, No. 4, Apr. 1990, pp. 257-259.

Sahara et al., "Strongly Improved Frequency Response at High-Optical Input Powers from InGaAsP Compensated Strain MQW Electroabsorption Modulators", IEEE Photonics Technology Letters, vol. 7, No. 9, Sep. 1995, pp. 1004-1006.

Shin et al., "High-Power Electroabsorption Modulator Using Intra-Step-Barrier Quantum Wells", Journal of Applied Physics, vol. 89, No. 2, Jan. 15, 2001, pp. 1515-1517.

Wakita et al., Jpn. J. Appl. Phys., Part 1, No. 3B, 1998, pp. 1432-1435.

Welstand et al., "Dual-Function Electroabsorption Waveguide Modulator/Detector for Optoelectronic Transceiver Applications", IEEE Photonics Technology Letters, vol. 8, No. 11, Nov. 1996, pp. 1540-1542.

Wood et al., "Electric Field Screening by Photogenerated Holes in Multiple Quantum Wells: A New Mechanism for Absorption Saturation", Appl. Phys. Lett., vol. 57, No. 11, Sep. 10, 1990, pp. 1081-1083.

Wood et al., "Increased Optical Saturation Intensities in GaInAs Multiple Quantum Wells by the Use of AlGaInAs Barriers", Electronics Letters, vol. 27, No. 3, Jan. 31, 1991, pp. 257-259.

Yuh et al., "Optical Transitions in a Step Quantum Well", J. Appl. Phys., vol. 65, No. 11, Jun. 1, 1989, pp. 4377-4381.

\* cited by examiner

ELECTROABSORPTION MODULATOR HAVING A BARRIER INSIDE A QUANTUM WELL

PRIORITY CLAIM

This application claims priority of U.S. Ser. No. 60/2653,954 filed Feb. 1, 2001.

STATEMENT OF GOVERNMENT INTEREST

This invention was make with Government assistance under SPAWAR Grant 28001, Contract #N66001-99-M-1452. The Government has certain rights in this invention.

TECHNICAL FIELD

The present invention generally relates to electroabsorption modulators, and more particularly to a high-power electroabsorption modulator having a barrier inside quantum wells.

BACKGROUND ART

Electroabsorption modulators (EAMs) have been shown to be useful in fiber-optic links operating near either 1.3 or 1.55 µm for both analog and digital signal transmission. They are small in size and can be integrated with a laser diode, for example, while being very effective in changing the light intensity as a function of the applied electric field. In particular, EAMs that use multiple quantum well active regions are currently very popular. As those skilled in the art will understand, a quantum well is a material unit that has a very thin "well" material (typically of the order of 100 Angstrom) surrounded by potential energy barriers. Inside the quantum well, particle, such as electrons or holes, are restricted in motion in the dimension perpendicular to the well and has well-defined quantized states with respect to momentum and energy. The particles are free to move around in the other two directions. When these quantum wells are stacked together without interactions between each other, this resultant structure is referred to as multiple quantum wells (MQW). The MQW provides a large absorption-coefficient change via the quantum-confined Stark effect (QCSE), which is the shift of the excitonic (the resonance state of electron-hole pairs) absorption peak of the quantum well under the influence of an applied electric field. Typically, the peak shifts to lower energy when an electric field is applied.

An analog fiber link is an optical fiber communication channel for transmitting analog signals. For an externally modulated analog fiber link, which uses a transmitter with the light modulation occurring outside the laser source, increasing the received optical power reduces the link loss, which is the ratio of the input signal intensity to the output signal intensity. The output signal of the receiver is proportional to the square of the optical power. The optical power used in the link, however, is currently limited by the optical saturation properties of the EAM. An optical saturation occurs when the output signal intensity is no longer linearly proportional (or becomes sub-linear) to the input signal power to the EAM. Consequently, a concern for the MQW EAMs is their relatively low saturation optical power, where optical saturation begins. This power level can be determined from the optical power when the output signal intensity is 1 dB below that which corresponds to unsaturated modulation. The conventional MQW EAMs, particularly those made of InGaAs/InP, tend to saturate at a much lower level.

In quantum wells (QWs), the barriers hinder the sweep-out of the photo generated electrons and holes, particularly holes, resulting in carrier pile-up near the barriers. The traditional approach to reduce this effect had been to use InGaAsP or InAlAs (or InGaAlAs) instead of InP as barrier materials to reduce the valence band offset, which was shown to improve the optical saturation of the MQW EAMs. Also, there have been attempts to use strain-compensated InGaAsP/InGaAsP and InAsP/GaInP quantum wells, which have shallow wells, to improve the saturation optical power at 1.55 and 1.3 µm. A strained quantum well refers to a quantum well where either the barrier or the quantum well is lattice mismatched to the substrate so that the quantum well as a unit is under (tensile or compressive) hydrostatic strain. A strain compensated quantum well refers to a quantum well structure in which the well and the barrier are oppositely (compressive versus tensile) strained so that the net strain in one unit of quantum well is zero. Although it has been reported that the MQW EAMs with InGaAs/InAlAs can handle optical power up to 40 mW without degradation in the bandwidth, the link gain at RF frequencies was observed to saturate at a much lower level. The maximum optical power that does not cause RF gain saturation is currently limited to approximately 10 mW.

It has also been observed that increasing the electric field reduces the screening effect due to spatially distributed holes that cannot be drifted out of the quantum well (their presence causes an effective reduction of the applied electric field). Hence in order to increase the saturation optical power further, the operating bias must be increased for a given intrinsic layer thickness without compromising the modulator performance such as modulator slope efficiency, which is defined as the maximum change in optical transmission versus change in applied voltage.

DISCLOSURE OF INVENTION

One embodiment of the invention is directed to an electroabsorption modulator including first and second electrically conductive electrodes, and first and second cladding layers provided between the first and second electrodes. A quantum well layer is provided between the first and second cladding layers, and includes an InAlAs first region, an InGaAs second region adjacent the first region, and an InGaAlAs third region adjacent the second region.

In accordance with another embodiment of the present invention, an electroabsorption modulator includes first and second electrically conductive electrodes, and first and second cladding layers provided between the first and second electrodes. A multiple quantum well layer is provided between the first and second cladding layers, and each quantum well includes an InP (or InGaAsP) first region, an InGaAs (or InGaAsP) second region adjacent the first region, and an InGaAsP third region adjacent the second region.

Another embodiment of the invention is directed to an electroabsorption modulator having at least one quantum well in a conduction band and a corresponding quantum well in a valence band. A step barrier made from InGaAlAs or InGaAsP is formed within the quantum wells of both the conduction and valence bands.

A further embodiment of the present invention relates to a method for delaying a red shift of a quantum-confined Stark effect to a higher electric field, and increasing transition energy and an oscillator strength response after the onset of the red shift, in an electroabsorption modulator. The method includes creating at least one first quantum well in a conduction band and at least one corresponding second quantum well in a valence band, and forming a step barrier made from InGaAlAs or InGaAsP in a portion of the first and second quantum wells.

BEST MODE OF CARRYING OUT THE INVENTION

Figure 1:
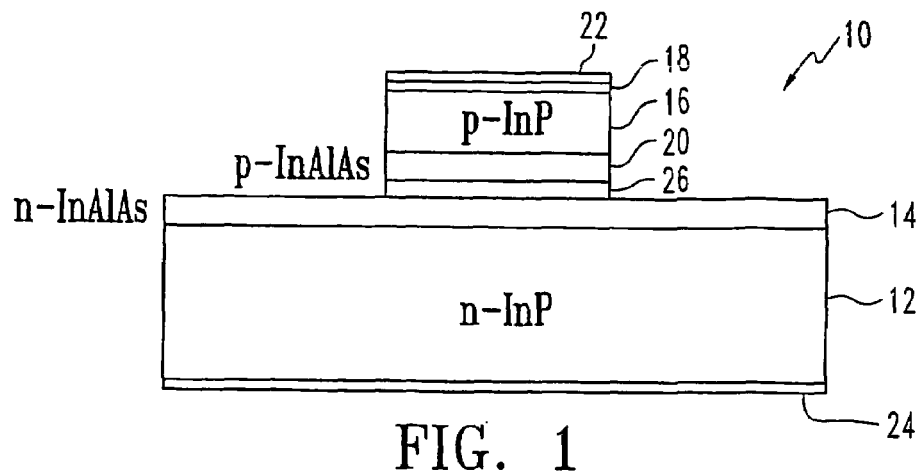
FIG. 1 is an electroabsorption modulator in accordance with an embodiment of the present invention.

Turning now to FIG. 1, an electroabsorption modulator (EAM) in accordance with an embodiment of the invention is indicated generally at 10, and includes a n-InP substrate 12 in contact with an n-InAlAs waveguide cladding layer 14 (where n indicates an electron concentration, for example, of approximately $1 \times 10^{18}$ cm$^{-3}$, in this embodiment). The EAM 10 also includes an p-InP buffer layer 16 provided between a heavily doped p-InGaAs contact layer 18 (where p indicates hole concentration, for example, of approximately $1 \times 10^{18}$ cm$^{-3}$ in this embodiment) and a p-InAlAs waveguide cladding layer 20 (where p=$1 \times 10^{18}$ cm$^{-3}$). On the surface opposite the p-InP buffer layer 16, the p-InGaAs contact layer 18 is in contact with a positive electrode 22 made of electrically conductive metal alloy such as AuZn followed by gold, for example. Similarly, the surface of the n-InP substrate 12 opposite the waveguide cladding layer 14 is in contact with an n type electrode 24, which is also made of electrically conductive metal alloy such as AuGe followed by gold, for example.

A multiple intra-step-barrier quantum well (IQW) layer 26 is provided between the two waveguide cladding layers 14, 20, and includes repeating regions of an InAlAs barrier 28, an InGaAs well 30 and an InGaAlAs intra-step-barrier 32 (best shown in FIGS. 2–5), in the direction generally perpendicular to the surfaces of the waveguide cladding layers 14, 20. In one embodiment, the InGaAlAs of the IQW layer 22 is grown by repeating InGaAs/InAlAs layers several times to form a short-period superlattice, and the EAM 10 is grown by molecular beam epitaxy.

Turning now to FIGS. 2–5, an exemplary energy band diagrams of the IQW layer 26 includes the $In_{0.52}Al_{0.48}As$ barrier 28, the $In_{0.53}Ga_{0.47}As$ well 30 and the $In_{0.53}Ga_{0.33}Al_{0.14}As$ intra-step-barrier 32 for both conduction ($E_c$) and the valence ($E_v$) bands. The nominal bandgap energy of the $In_{0.53}Ga_{0.33}Al_{0.14}As$ intra-step-barrier layer 32 is 0.97 eV and the layer is lattice-matched to InP. It should be noted that the intra-step-barriers 32 in the conduction ($E_c$) and valence ($E_v$) bands are generally symmetrical or mirror images of each other, although the depths of the wells 30 and the heights of the step-barriers 32 may differ somewhat as a result of the chemical make-up of the wells and the step-barriers.

FIGS. 2–5 show the IQW layer 26 with energy levels of a first electron state (E1) and a first heavy hole state (HH1), and the electrons and hole envelope wave functions 34, 36 for a total well region 38 (i.e., the well 30 and the intra-step-barrier 32) having a width of 10 nm, at various electric fields. In this example, the IQW layer 26 was analyzed with a finite-difference method using the envelope wave functions model under the effective-mass approximation. Only the transition from the first heavy-hole state (HH1) to the first electron state (E1) has been considered.

At zero electric field (FIG. 2), the electrons in the conduction band $E_c$ is rather loosely confined over the whole well region 38, while the holes are tightly confined in the well 30 (i.e., the InGaAs well 30) of the valence band $E_v$. This is mostly due to the effective mass difference. As the electric field is applied in the $-z$ direction (e.g., 100 kV/cm) (FIG. 3), the electron envelope wavefunction 34 moves in the $+z$ direction, while the hole envelope wavefunction 36 begins to cross over the intra-step-barrier 32 in the $-z$ direction. Up to this point, the overall transition energy shift is very small or even a little positive ("blue-shifted"). This is because the hole energy level increases with the electric field although the electron energy level decreases. Hence, the normal "red-shifted" quantum-confined Stark effect (QCSE) is effectively suppressed.

With the electric field further increased (e.g., 140 kV/cm) (FIG. 4), the energy shift becomes negative (red-shifted), as the hole envelope wavefunction 36 crosses further over the intra-step-barrier 32 of the valence band $E_v$ and the hole energy level starts to decrease. Also the oscillator strength, which is a measure of the transition probability leading to electroabsorption in the quantum well, is proportional to the square of the spatial overlap integral between the electron and the hole envelope wavefunctions 34, 36, and is reduced dramatically as the hole envelope wavefunction crosses over the intra-step-barrier 32, due to the spatial separation of the wavefunctions. At an even larger electric field, (e.g., 200 kV/cm) (FIG. 5), the holes are mostly confined over the intra-step-barrier 32 and the oscillator strength becomes very small.

Figure 6:
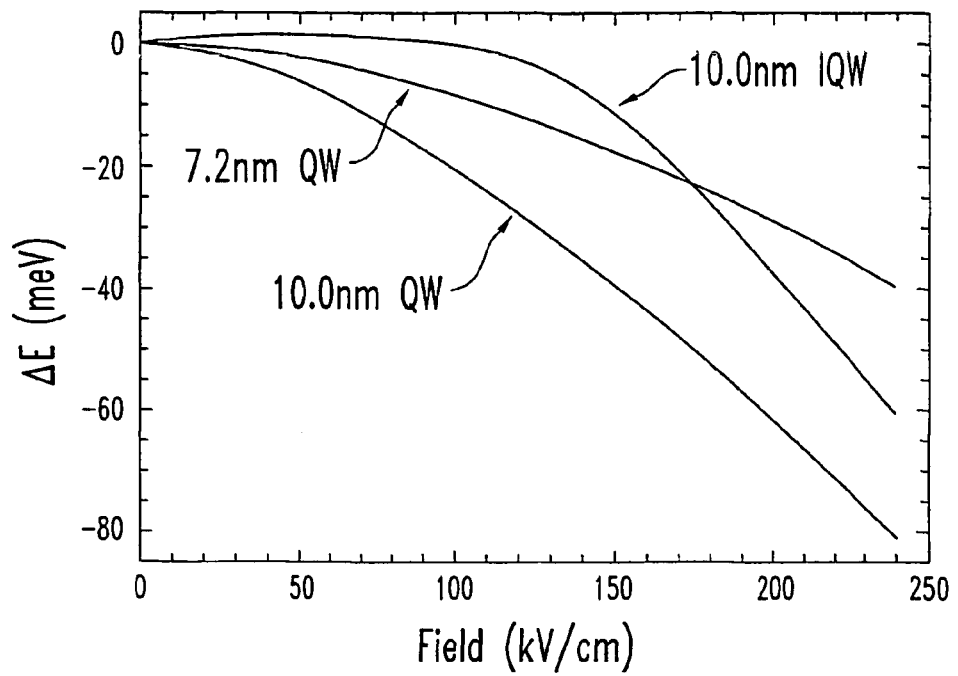
FIG. 6 is a graph showing the transition energy shift as a function of the electric field for the electroabsorption modulator of FIG. 1, compared with conventional electroabsorption modulators.
Figure 7:
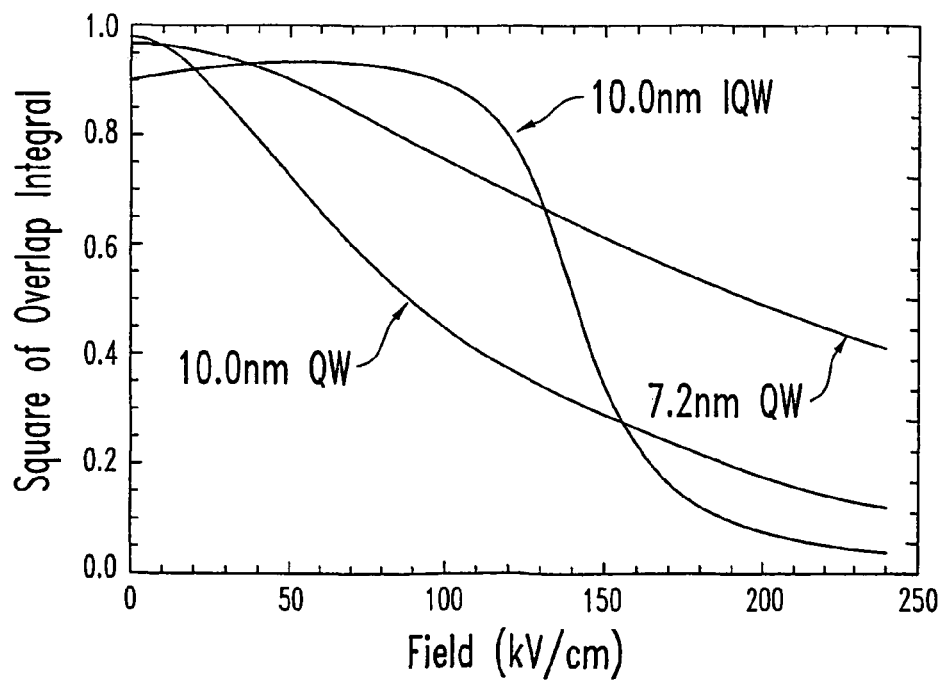
FIG. 7 is a graph showing the square of the overlap integral as a function of the electric field for the electroabsorption modulator of FIG. 1, compared with conventional electroabsorption modulators.

The result is summarized in FIG. 6 for the change in the transition energy, and in FIG. 7 for the square of overlap integral as a function of the applied electric field. The results are compared with conventional quantum wells (QW) with thickness of 7.2 nm and 10.0 nm. The 7.2 nm QW was chosen as a conventional QW for 1.55 μM operation. The 10.0 nm QW was chosen to show the effect of intra-step-barrier, although the zero-field transition energy is not the same as that of the IQW of the same thickness.

In FIG. 6, it can be seen that the intra-step-barrier 32 (best shown in FIG. 2) effectively suppresses the onset of the red shift of the QCSE for up to approximately 100 kV/cm. After this point, the transition energy decreases quickly, crossing that of a 7.2-nm thick conventional QW with a steeper slope. This implies that the EAM 10 with the IQW 26 will be more efficient than that of the conventional QW. When compared with the conventional QW with thickness of 10.0 nm, the slope of the energy shift with respect to the electric field is similar after approximately 100 kV/cm, the curve for the IQW 26 being translated to a higher electric field. Hence the IQW 26 effectively takes advantage of the wider well region 38 width, with the delayed onset of the red shift. FIG. 7 illustrates a unique feature in the square of the overlap integral of this IQW 26. This sharp change combined with the energy shift gives a very good QCSE.

With the above results, the change in the absorption coefficient with the electric field was estimated for the 7.2-nm thick conventional quantum well. A Gaussian broadening function was used, whose zero-field full width at half maximum (FWHM) was obtained from experimental values (~20 me.V). It was varied following the overlap-integral change with the electric field. The absorption coefficient was also estimated from the experimental values. The transfer curve as a function of the applied bias was then calculated for the EAM with intrinsic layer thickness of 0.25 μm, an optical confinement factor of 0.20, and a waveguide length of 200 μm for 1.55 μm light. The same calculation was repeated for the EAM 10 with the 10.0-nm IQWs with the same device parameters, using the same form of Gaussian broadening.

Figure 8:
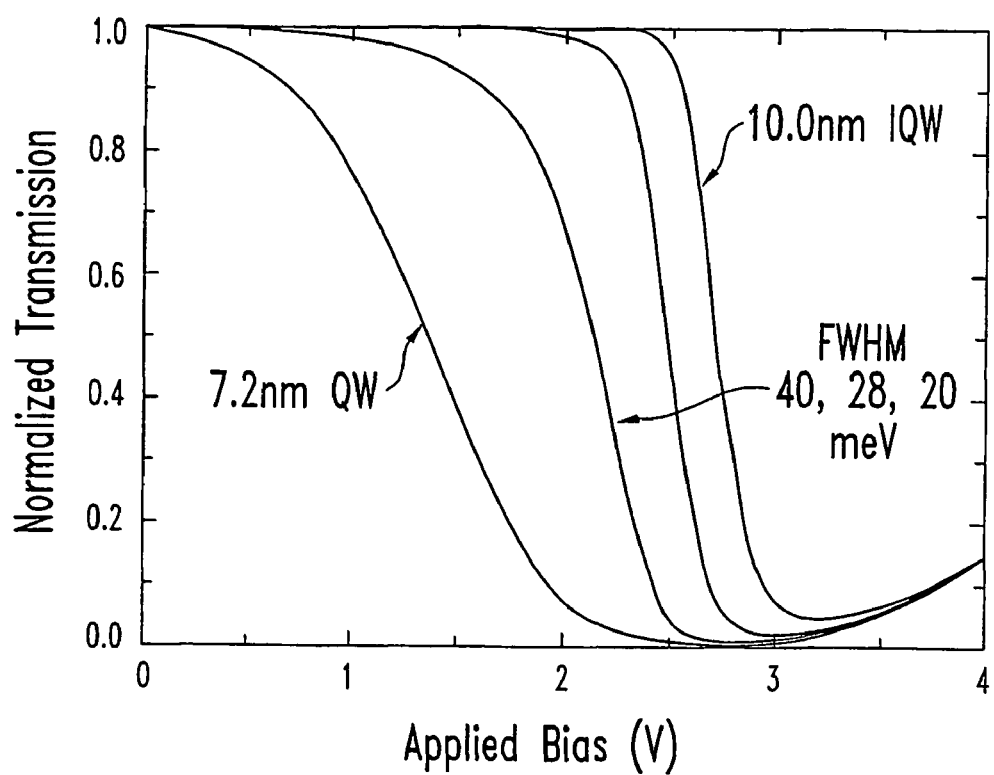
FIG. 8 is a graph showing the normalized transmission of the electroabsorption modulator of FIG. 1, compared with conventional electroabsorption modulators.

Turning now to FIG. 8, the estimated transfer curves show that the present EAM 10 with IQW 26 can be operated at a higher bias for the highest modulator slope efficiency. For instance, for the FWHM of 20 meV, the highest slope efficiency for the IQW EAM 10 (2.9 V$^{-1}$) occurs at approximately 2.7 V, while for the conventional QW EAM, it happens at about 1.4 V, which represents an increase by a factor of approximately 2. Moreover, the slope efficiency itself is increased by a factor of about 3.6 with the use of the present IQW 26, which is the consequence of the sharper transition energy shift with the IQW at a higher electric field. This means that the IQW EAM 10 will not only improve the saturation optical power, but also yield a higher slope efficiency.

Figure 9:
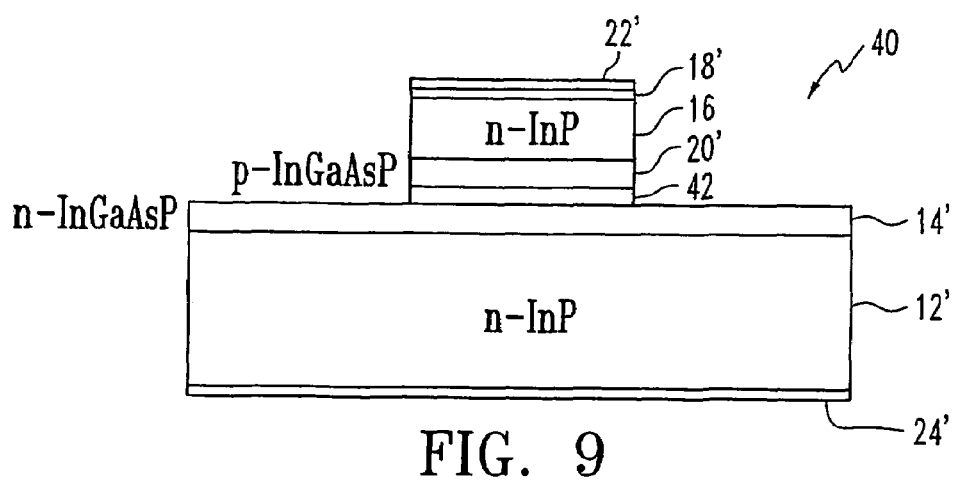
FIG. 9 is an electroabsorption modulator in accordance with another embodiment of the present invention.

Referring to FIG. 9, an electroabsorption modulator (EAM) in accordance with another aspect of the present invention is indicated generally at 40 and includes features similar to those described above with respect to the EAM 10 of FIG. 1. The EAM 40 includes a n-InP substrate 12' in contact with an n-InGaAsP waveguide cladding layer 14' (n=1×10$^{18}$ cm$^{-3}$). The EAM 40 also includes an n-InP buffer layer 16' provided between a p-InGaAs contact layer 18' (p=1×10$^{18}$ cm$^{-3}$) and a p-InGaAsP waveguide clading layer 20' (p=1×10$^{18}$ cm$^{-3}$). On the surface opposite the p-InP buffer layer 16', the p-InGaAs contact layer 18' is in contact with a positive electrode 22' made of electrically conductive metal alloy such as AuZn followed by gold, for example. Similarly, the surface of the n-InP substrate 12' opposite the n-InGaAsP waveguide clading layer 14' is in contact with a negative electrode 24', which is also made of electrically conductive metal alloy such as AuGe, followed by gold, for example.

Figure 10:
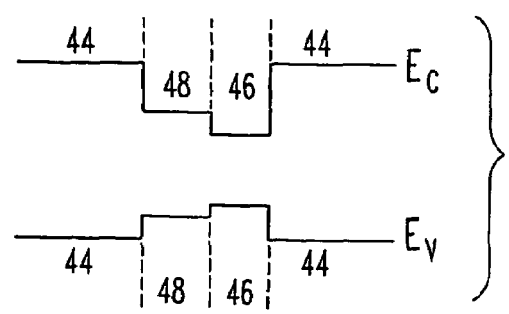
FIG. 10 is an energy band diagram of the electroabsorption region of the modulator of FIG. 9.
Figure 2:
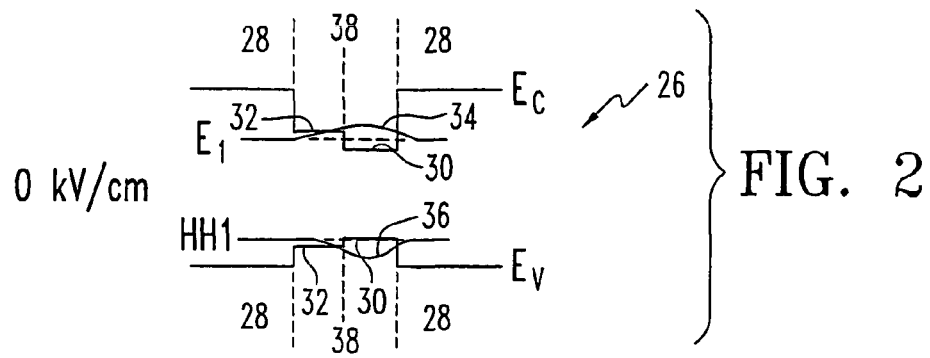
FIG. 2 is an energy band diagram of the electroabsorption region of the modulator of FIG. 1 at zero electric field.
Figure 3:
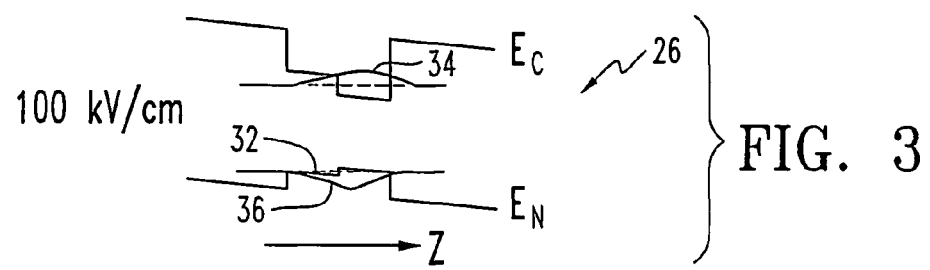
FIG. 3 is an energy band diagram of the electroabsorption region of the modulator of FIG. 1 at electric field of approximately 100 kV/cm.
Figure 4:
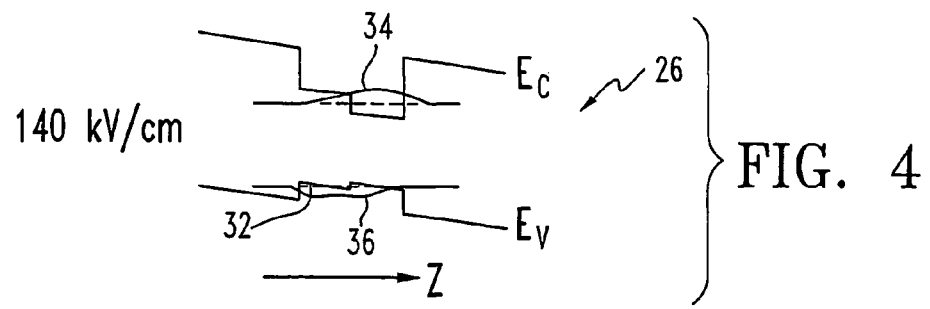
FIG. 4 is an energy band diagram of the electroabsorption region of the modulator of FIG. 1 at electric field of approximately 140 kV/cm.
Figure 5:
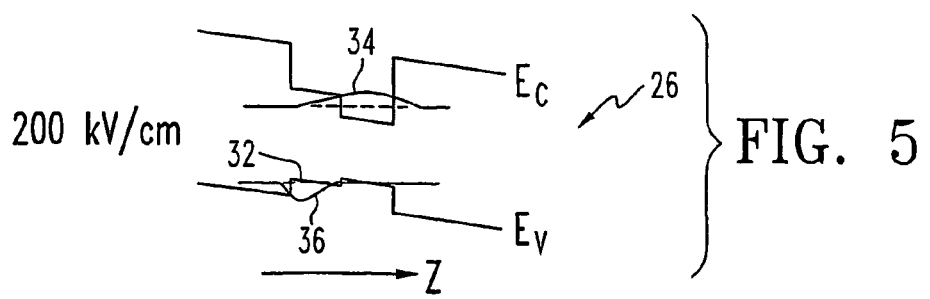
FIG. 5 is an energy band diagram of the electroabsorption region of the modulator of FIG. 1 at electric field of approximately 200 kV/cm.

A multiple intra-step-barrier quantum well (IQW) layer 42 is provided between the waveguide cladding layers 14', 20', and includes repeating regions of an InP (or InGaAsP) barrier 44, an InGaAs (or InGaAsP) well 46 and an InGaAsP 48 intra-step-barrier 32 (best shown in FIG. 10), in the direction perpendicular to the surfaces of the waveguide cladding layers 14', 20'. In one embodiment, the InGaAsP intra-step-barrier of the IQW layer 42 is grown by repeating InGaAs/InP layers several times to form a short-period superlattice, and the EAM 40 is grown by molecular beam epitaxy or organometallic vapor phase epitaxy.

It should be understood that other material systems can also be used to obtain an electroabsorption modulator having an intra-step-barrier quantum well in both the conduction band $E_c$ and the valence band $E_v$, with some modification on the band offsets, effective masses, and the composition of the well, barrier, and the intra-step-barrier.

From the foregoing description, it should be understood that an improved electroabsorption modulator (EAM) has been shown and described which has many desirable attributes and advantages. The intra-step-barrier quantum well (IQW) moves the onset of the red-shifted QCSE to a higher electric field. After the onset of the red shift, the transition energy and the oscillator strength respond sharply to the electric field. The present EAM with the IQW operates at a higher optical power with enhanced modulator slope efficiency, which enhances the optical link performance.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. An electroabsorption modulator apparatus comprising:
first and second electrically conductive electrodes;
first and second cladding layers provided between said first and second electrodes;
a quantum well layer provided between said first and second cladding layers, said quantum well layer including an InAlAs first region, an InGaAs second region adjacent said first region, and an InGaAlAs third region adjacent said second region;
a substrate provided between said first electrode and said first cladding layer;
a contact layer provided between said second electrode and said second cladding layer; and a buffer layer provided between said contact layer and said second cladding layer.

2. The apparatus as defined in claim 1 wherein said first and second cladding layers are InAlAs or InGaAlAs, and said substrate is InP.

3. The apparatus as defined in claim 2 wherein said second electrode is made of AuZn and Au, said contact layer is InGaAs, and said buffer layer is InP.

4. An electroabsorption modulator apparatus comprising:
at least one first quantum well in a conduction band;
a corresponding second quantum well in a valence band;
a first barrier formed within said first quantum well; and
a second barrier formed within said second quantum well;
wherein said first and second barriers are formed from InGaAlAs.

5. The apparatus as defined in claim 4 further including:
a third barrier defining one side of said first well in said conduction band;
a fourth barrier defining one side of said second well in said valence band;

wherein said first barrier is separated from said third barrier and said second barrier is separated from said fourth barrier, and said first and second barriers are symmetrically formed in a lateral direction of said conduction and valence bands.

6. The apparatus as defined in claim 5 wherein a concentration of electrons in said conduction band are substantially over said first well, and a concentration of holes in said valance band in said second well is substantially in an area between said second and fourth barriers, when no electric field is applied to said apparatus, and wherein said concentration of said electrons shifts over increasingly to an area between said first and third barriers in said first well, and said holes increasingly shifts out of said area between said second and fourth barriers and over to said second barrier, as electric field is applied to said conduction and valence bands in the direction substantially perpendicular to said third and fourth barriers.

7. The apparatus as defined in claim 5 wherein said third and fourth barriers are formed from InAlAs, and said first and second wells are formed from InGaAs.

8. An electroabsorption modulator apparatus comprising:
at least one first quantum well in a conduction band;
a corresponding second quantum well in a valence band;
a first barrier formed within said first quantum well;
a second barrier formed within said second quantum well;
wherein said first and second barriers are formed from InGaAsP;
a third barrier defining one side of said first well in said conduction band;
a fourth barrier defining one side of said second well in said valence band;
wherein said third and fourth barriers are formed from InP or InGaAsP, and said first and second wells are formed from InGaAs or InGaAsP.

9. An electroabsorption modulator apparatus comprising:
first and second electrically conductive electrodes;
first and second cladding layers provided between said first and second electrodes; and
a quantum well layer provided between said first and second cladding layers, said well layer including an InP first region, an InGaAs second region adjacent said first region, and an InGaAsP third region adjacent said second region;
a substrate provided between said first electrode and said first cladding layer;
a contact layer provided between said second electrode and said second cladding layer; and
a buffer layer provided between said contact layer and said second cladding layer.

10. The apparatus as defined in claim 9 wherein said first and second cladding layers are InGaAsP, and said substrate is InP.

11. The apparatus as defined in claim 10 wherein said second electrode is made of AuZn and Au, said contact layer is InGaAs, and said buffer layer is InP.

12. A method for delaying a red shift of a quantum-confined Stark effect to a higher electric field, and increasing transition energy and an oscillator strength response after the onset of the red shift, in an electroabsorption modulator, said method comprising the steps of:
creating at least one first quantum well in a conduction band;
creating at least one corresponding second quantum well in a valence band;
forming a first barrier in a portion of said first quantum well; and
forming a second barrier in a portion of said second quantum well;
wherein said first and said second barriers are formed from InGaAlAs.

13. The method as defined in claim 12 wherein said first and second wells are formed from InGaAs or InGaAlAs.

14. The method as defined in claim 13 further including the step of creating third and fourth barriers defining each said first and second wells, wherein said third and fourth barriers are formed from InAlAs or InGaAlAs.

15. A method for delaying a red shift of a quantum-confined Stark effect to a higher electric field, and increasing a transition energy and an oscillator strength response after the onset of the red shift, in an electroabsorption modulator, said method comprising the steps of:
creating at least one first quantum well in a conduction band;
creating at least one corresponding second quantum well in a valence band;
forming a first barrier in a portion of said first quantum well; and
forming a second barrier in a portion of said second quantum well;
wherein said first and said second barriers are formed from InGaAsP.

16. The method as defined in claim 15 wherein said first and second wells are formed from InGaAs or InGaAsP.

17. The method as defined in claim 16 further including the step of creating third and fourth barriers defining each said first and second wells, wherein said third and fourth barriers are formed from InP or InGaAsP.

* * * * *

UNITED STATES PATENT AND TRADEMARK OFFICE
CERTIFICATE OF CORRECTION

| | | |
|---|---|---|
| PATENT NO. | : 7,095,542 B2 | Page 1 of 1 |
| APPLICATION NO. | : 10/470783 | |
| DATED | : August 22, 2006 | |
| INVENTOR(S) | : Yu et al. | |

It is certified that error appears in the above-identified patent and that said Letters Patent is hereby corrected as shown below:

In column 1, line 7, please delete "U.S. Ser. No. 60/2653,", and insert --U.S. Ser. No. 60/265, -- therefor.

Signed and Sealed this

Sixth Day of February, 2007

JON W. DUDAS
*Director of the United States Patent and Trademark Office*